(12) United States Patent
Lin (10) Patent No.: US 9,996,117 B2
(45) Date of Patent: Jun. 12, 2018

(54) TOUCH DEVICE AND METHOD FOR CONTROLLING THE SAME TO PERFORM A POWER-SAVING FUNCTION OR A POWER-ON FUNCTION

(71) Applicant: INSYDE SOFTWARE CORP., Taipei (TW)

(72) Inventor: Wen-Ming Lin, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 0 days. days.

(21) Appl. No.: 14/291,349

(22) Filed: May 30, 2014

(65) Prior Publication Data

US 2014/0362009 A1 Dec. 11, 2014

(30) Foreign Application Priority Data

Jun. 7, 2013 (TW) .............................. 102120274 U
Jun. 26, 2013 (TW) .............................. 102122680 U (51) Int. Cl.
*G09G 5/00* (2006.01)
*G06F 1/16* (2006.01)
*G06F 1/32* (2006.01)

(52) U.S. Cl.
CPC .......... *G06F 1/1694* (2013.01); *G06F 1/3203* (2013.01); *G06F 1/3206* (2013.01); *G06F 1/3231* (2013.01); *Y02D 10/173* (2018.01)

(58) Field of Classification Search
CPC ... G09G 5/00; G01C 9/06; G06K 9/00; G06F 3/041; G06F 1/3203; G06F 3/017; G06F 1/1626

USPC .............. 33/366.24; 345/156, 173; 382/189; 455/414.2

See application file for complete search history.

(56) References Cited

U.S. PATENT DOCUMENTS

| | | | | |
|---|---|---|---|---|
| 2002/0021278 | A1* | 2/2002 | Hinckley et al. | 345/156 |
| 2006/0137198 | A1* | 6/2006 | Cato | 33/366.24 |
| 2009/0195497 | A1* | 8/2009 | Fitzgerald | G06F 1/3203 345/156 |
| 2009/0226091 | A1* | 9/2009 | Goldsmith et al. | 382/189 |
| 2010/0136957 | A1* | 6/2010 | Horodezky | G06F 3/017 455/414.2 |

* cited by examiner

*Primary Examiner* — Abdul-Samad A Adediran
(74) *Attorney, Agent, or Firm* — Muncy, Geissler, Olds & Lowe, P.C.

(57) ABSTRACT

A method for controlling a touch device to power on or power off has steps of receiving direction information of the touch device; determining if the touch device is oriented to a direction that is outside or inside a preset viewing angle according to the direction information; detecting a gesture present on the touch device; and performing a power-saving function or a power-on function when detecting the gesture present on the touch device and determining that the direction of the touch device is outside or inside the preset viewing angle. The foregoing technique can replace the power-saving function and the power-on function activated by pressing a physical power button. Accordingly, operational frequency and failure rate of the physical power button can be reduced and an intuitive method for powering on or off the touch device with easy operation can thus be provided.

19 Claims, 13 Drawing Sheets

TOUCH DEVICE AND METHOD FOR CONTROLLING THE SAME TO PERFORM A POWER-SAVING FUNCTION OR A POWER-ON FUNCTION

BACKGROUND OF THE INVENTION

1. Field of the Invention

The present invention relates to a touch device, and more particularly to a touch device performing power-on and power-saving functions without going through physical power button and a method for controlling the touch device to perform a power-saving function or a power-on function.

2. Description of the Related Art

Sale growth of mobile touch devices, such as smart phones, tablet personal computers (PC), and population using the mobile touch devices have been continuously on the rise in recent years. Besides, according to survey, web site browsing traffic through tablet PCs and smart phones has taken a substantial percentage of entire network traffic. As far as certain functions are concerned, people rely on the mobile touch devices more and more and the mobile touch devices have gradually replaced the role of conventional personal computers.

To meet the need of on-line games and internet surfing on the mobile touch devices, the displays of the mobile touch devices tend to increase in size, and hardware and software levels required by the mobile touch devices are also demanding. Under the circumstance, power consumption of the mobile touch devices inevitably increases. Thus, regular smart phones and tablet PCs need to be charged frequently to maintain a normal power capacity for operation. To extend the standby time of the mobile touch devices and reduce power consumption, users oftentimes control the mobile touch devices to enter a hibernation mode or power off after finishing operation of the mobile touch devices. In case the mobile touch devices are operated again, the mobile touch devices can be powered on by pressing a power button or terminate the hibernation mode.

The mobile touch devices differ from regular electronic devices in that the power button of the mobile touch devices not only serves to power on or off the mobile touch devices, but also serves to activate the hibernation mode, wake up from the hibernation mode and perform other auxiliary functions. It means that the power button is a highly used element.

As the power button is a mechanical switch, frequent use of the power button will lead to shorter life duration thereof. The most effective way is to lessen the use of the power switch.

Formerly, the mobile touch devices used to power on, power off or terminate the hibernation mode through operation of the power button. However, the power buttons of most current mobile touch devices are rather small. Upon operation, the user locates and presses these power buttons by fumbling around and looking for a protruding form thereof. Many users add cases or covers to protect the mobile touch devices or make them aesthetically appealing. Due to the thickness of the cases and covers on the mobile touch devices, the protruding power buttons are sunken into the cases and covers and thus result in operational inconvenience.

SUMMARY OF THE INVENTION

A first objective of the present invention is to provide a touch device and a method for controlling the touch device to perform a power-saving function to replace a physical power button of the touch device for activating the power-saving function according to direction information of the touch device for determination of user's operation intention and a designated gesture.

To achieve the first objective, the method for controlling a touch device to power off is performed by the touch device, and the method has steps of:

receiving direction information of the touch device;

determining if the touch device is oriented to a direction that is out of a preset viewing angle according to the direction information;

detecting a gesture present on the touch device; and performing a power-saving function when detecting the gesture present on the touch device and determining that the direction of the touch device is out of the preset viewing angle.

The foregoing method sends a power-saving command to enter a hibernation mode or power off the touch device after determining that the preset viewing angle of the touch device is outside user's line of sight and a designated power-on gesture is detected on the touch device. Given the foregoing method, users just need to turn the touch device to be out of the preset viewing angle and make the power-off gesture instead of pressing the physical power button to launch the same. Accordingly, the power-saving function can be easily launched and the physical button is less failure-prone due to less operational frequency. As the power-saving function can be performed without the use of the physical power button, performing the power-saving function is not concerned with the size, location and element of the physical power button.

To achieve the foregoing objective, the touch device has a touch control interface, a direction sensor unit, and a controller.

The touch control interface has a touch sensitive area and a displayed area.

The direction sensor unit serves to detect a direction of the touch device and provide direction information of the touch device.

The controller is connected to the touch sensitive area, the displayed area, and the direction sensor unit, and determines whether to perform a power-saving function according to the direction information provided by the direction sensor unit and a gesture detected on the touch sensitive area of the touch control interface.

The controller of the foregoing touch device performs a power-saving function according to the direction of the touch device sensed by the direction sensor unit and the gesture detected on the touch sensitive area to enter a hibernation mode and power off the touch device. Accordingly, the combination of a simple movement of the touch device and a designated gesture can easily perform the power-saving function, thereby significantly lowering the use of a physical power button.

A second objective of the present invention is to provide a touch device and a method for controlling the touch device to perform a power-on function to replace a physical power button of the touch device for activating the power-on function according to direction information of the touch device for determination of user's operation intention and a designated gesture.

To achieve the second objective, the method for controlling a touch device to power on is performed by the touch device, and the method has steps of:

receiving direction information of the touch device;

determining if the touch device is oriented to a direction that is within a preset viewing angle according to the direction information;

detecting a power-on gesture being present on the touch device; and performing a power-on function when detecting that the power-on gesture is present on the touch device and determining that the direction of the touch device is within the preset viewing angle.

The foregoing method sends a power-on command to wake up from the hibernation mode or power on the touch device after determining that the preset viewing angle of the touch device is inside user's line of sight and a designated power-on gesture is detected on the touch device. Given the foregoing method, users just need to turn the touch device to be within a range of the preset viewing angle and make the power-on gesture instead of pressing the physical power button to perform the same. Accordingly, the power-on function can be easily performed and the physical button is less failure-prone due to less operational frequency. As the power-on function can be performed without the use of the physical power button, performing the power-on function is not concerned with the size, location and element of the physical power button.

To achieve the second objective, the touch device has a touch control interface, an accelerometer sensor and a controller.

The touch control interface has a touch sensitive area and a displayed area.

The accelerometer sensor provides direction information of the touch device.

The controller is connected to the touch sensitive area, the displayed area and the accelerometer sensor, and determines whether to perform a power-on function according to the direction information provided by the accelerometer sensor and a power-on gesture detected on the touch sensitive area of the touch control interface.

The controller of the foregoing touch device performs a power-on function according to the direction of the touch device sensed by the direction sensor unit and the gesture detected on the touch sensitive area to wake up from the hibernation mode or power on the touch device. Accordingly, the combination of a simple movement of the touch device and a designated gesture can easily perform the power-saving function, thereby significantly lowering the use of a physical power button.

Other objectives, advantages and novel features of the invention will become more apparent from the following detailed description when taken in conjunction with the accompanying drawings.

DETAILED DESCRIPTION OF THE INVENTION

Figure 1:
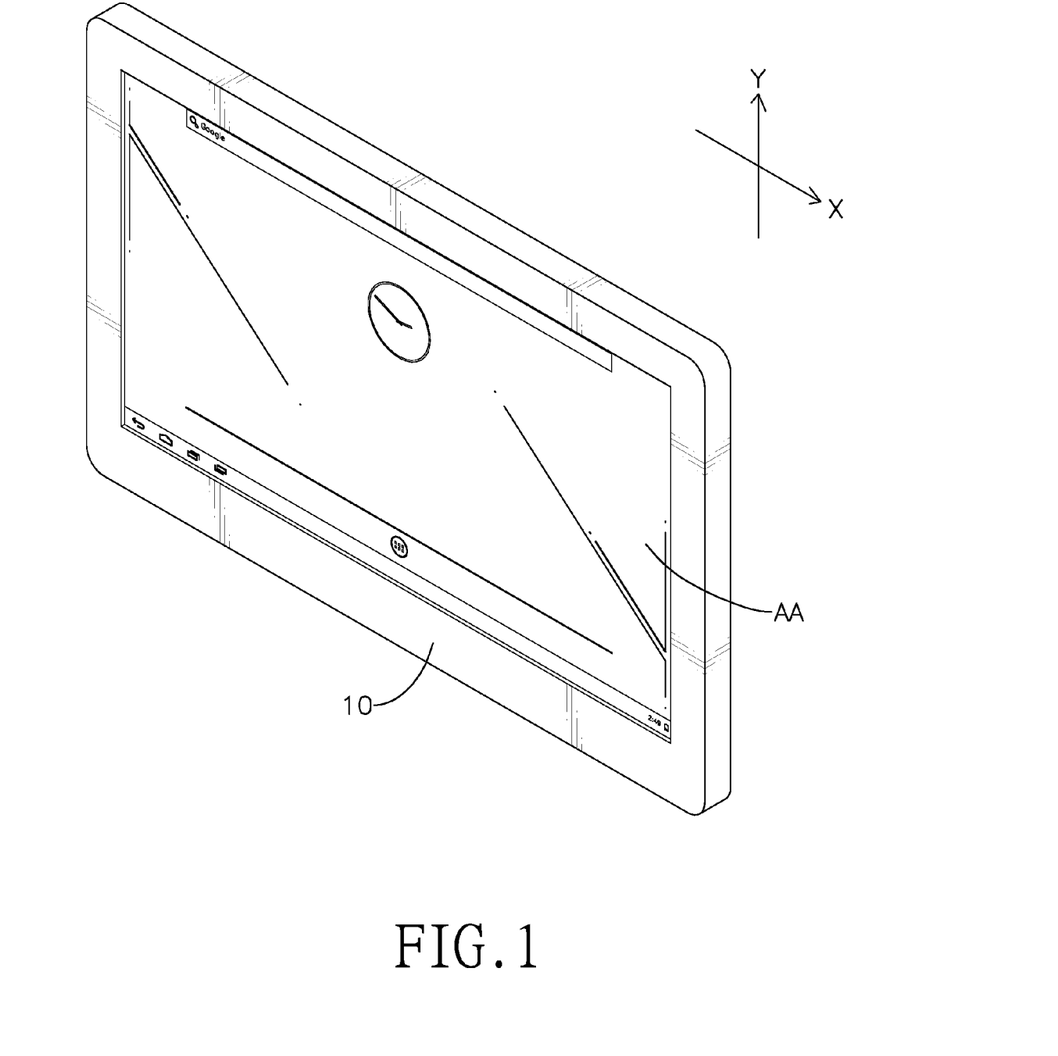
FIG. 1 is a perspective view of a touch device in accordance with the present invention.

With reference to FIG. 1, a touch device 10 in accordance with the present invention includes, but is not limited to, a smart phone, a tablet PC, a personal digital assistant (PDA), and a digital media player. The touch device 10 has a touch screen interface. The touch screen interface has an active area (AA). Except that the touch device is performing a special function (e.g. answering a call), the AA of the touch device 10 generally corresponds to user's line of sight. In other words, under a normal operating condition, the AA of the touch device 10 should be located within a range of user's line of sight. A regular touch screen interface includes a touch sensitive area and a displayed area. Given a liquid crystal display (LCD) as an example of the displayed area, a range of viewing angle is indicated in the specifications of the LCD, and user's line of sight depends on the viewing angle in the specifications of the display portion. For example, if the viewing angle in the specification of the displayed area is 120 degrees, the touch device is oriented to a direction, which falls in the range of the viewing angle, is considered to be within the user's line of sight. Besides the specification of the displayed area, users can go through the setting on the touch device to configure the viewing angle.

Determining if a user's designated gesture is performed on the touch screen interface and if the AA deviates from a range of a viewing angle associated with user's line of sight can be used as criteria for controlling the touch device 10 to perform a power-saving function or power on. However, description and illustration in the following cases cannot be construed as all possibilities of the AA's deviation from the range of the viewing angle.

Figure 2A:
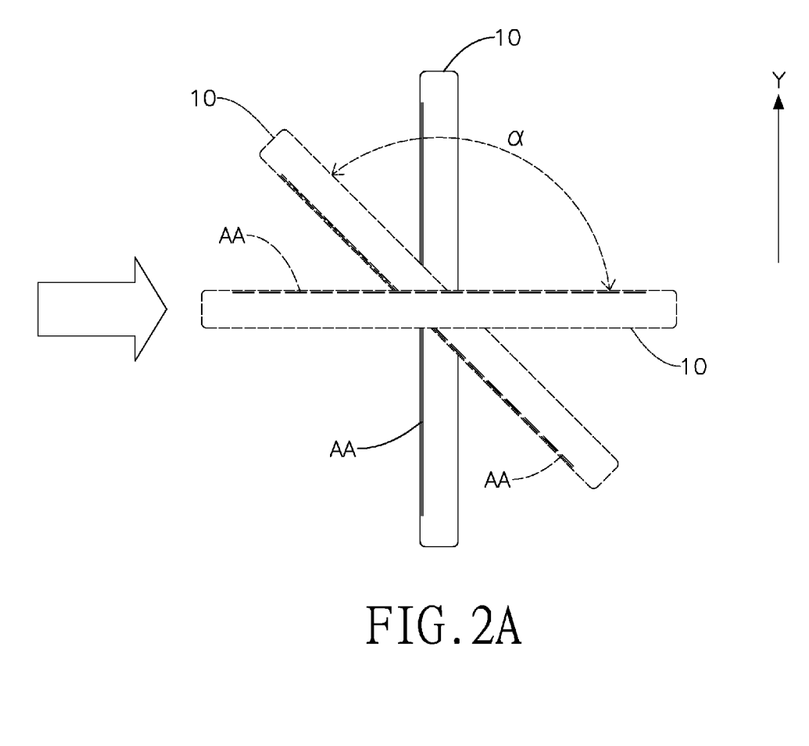
FIG. 2A is a schematic view showing that the touch device in FIG. 1 is oriented in a range of a user's line of sight.
Figure 2B:
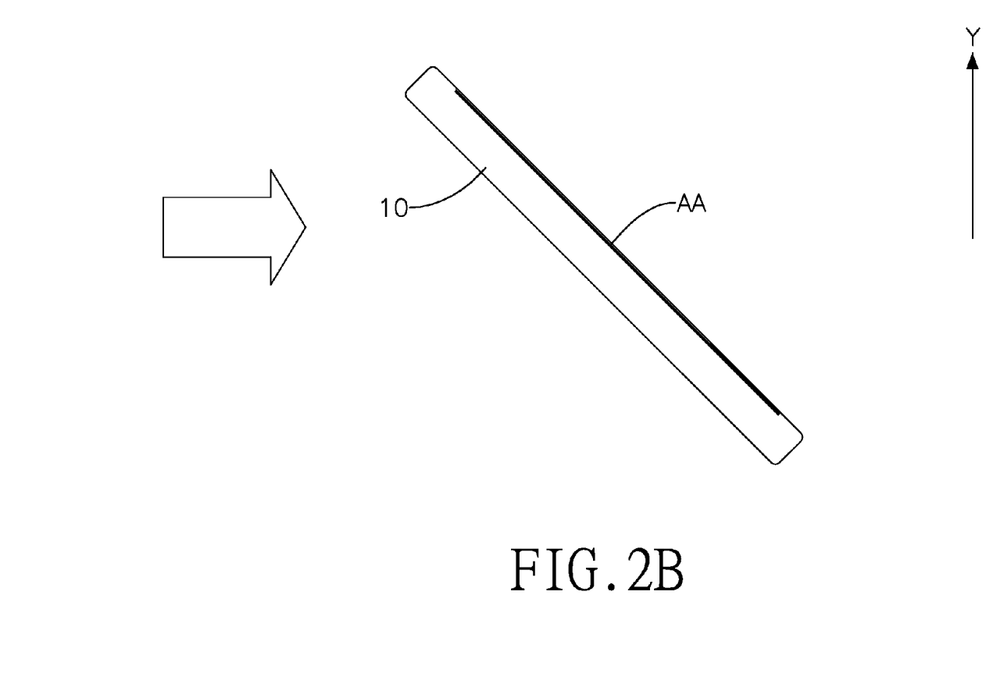
FIG. 2B is a schematic view showing that the touch device in FIG. 1 is deviated from the range of the user's line of sight in FIG. 2A.

With reference to FIG. 2A, an arrow on the left represents a user's line of sight. When the touch device 10 in an upright position is rotated with respect to a center line thereof and a vertical direction of the touch device 10 corresponding to a Y-axis direction is tilted at an angle, the user's line of sight is considered to be within the range of the viewing angle if the angle is less than a vertical oblique angle α. With reference to FIG. 2B, when the angle exceeds the vertical oblique angle α, the user's line of sight is considered to be out of the range of the viewing angle.

Figure 3A:
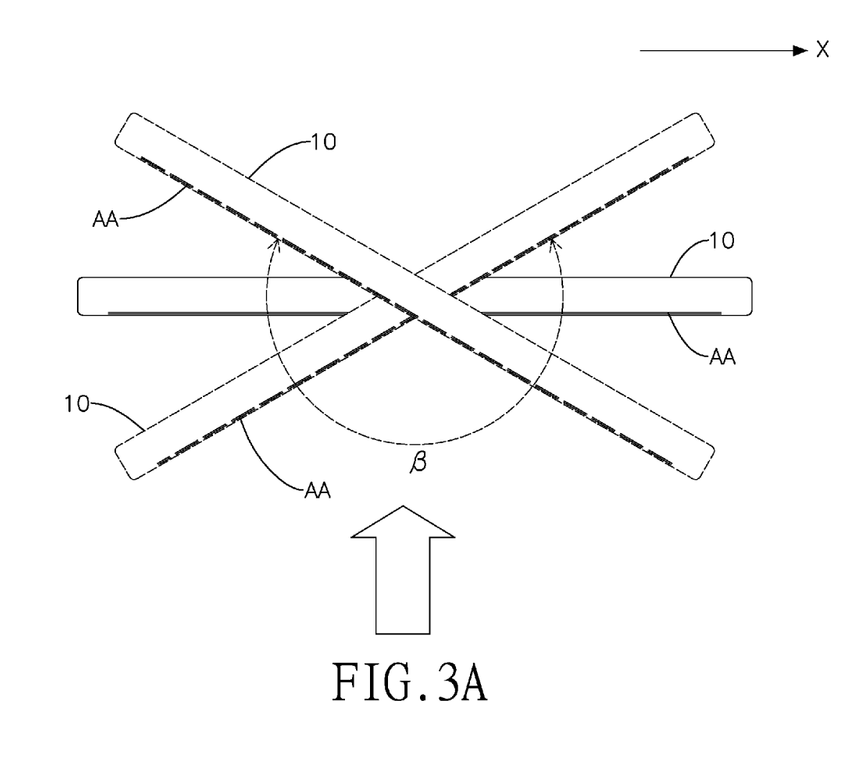
FIG. 3A is a schematic view showing that the touch device in FIG. 1 is oriented in another range of a user's line of sight.
Figure 3B:
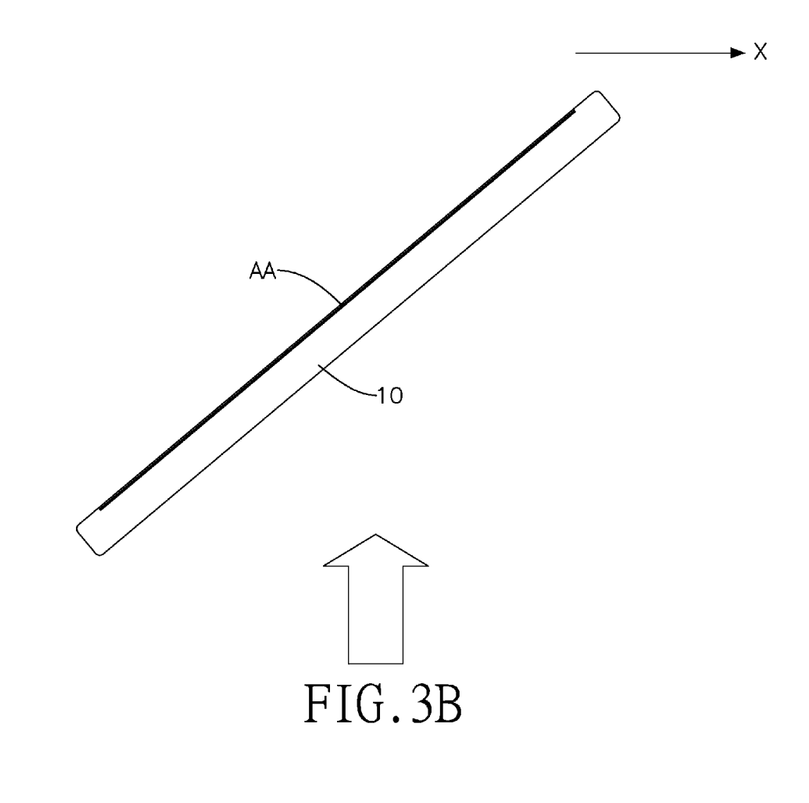
FIG. 3B is a schematic view showing that the touch device in FIG. 1 is deviated from the range of the user's line of sight in FIG. 3A.

With reference to FIG. 3A, an arrow on the bottom represents a user's line of sight. When the touch device 10 in a horizontal position is rotated with respect to a center line thereof and a horizontal direction of the touch device 10 corresponding to an X-axis direction is tilted at an angle, the user's line of sight is considered to be within the range of the viewing angle if the angle is less than a horizontal oblique angle β. With reference to FIG. 3B, when the angle exceeds the horizontal oblique angle β, the user's line of sight is considered to be out of the range of the viewing angle. The vertical oblique angle α and the horizontal oblique angle β can be adjusted based on actual demand or user's operational habit and can be alternately used for determination of user's line of sight out of the range of the viewing angle depending on the alignment of the touch device 10.

When the touch device is tilted to deviate from the range of the viewing angle of user's line of sight and the designated gesture is performed on the touch screen interface, a power-saving function can then be executed such that the touch device 10 enters a hibernation mode or powers off. The designated gesture includes, but is not limited to, the following kinds.

1. Multi-touch gesture: Fixed number of fingers (e.g. two or five fingers) click on the touch screen interface.
2. Swipe gesture: Swipe on the touch screen interface, for example, swiping from a left side to a right side of the AA or swiping from a top side to a bottom side of the AA.
3. Drawing gesture: Draw a figure, such as an 8-shaped figure, a circle and the like, on the touch screen interface.

When the touch device 10 detects the designated gesture on the touch screen interface and determines that the AA deviates from a range of a viewing angle, the power-saving function is executed. Basically, the design concept of controlling the touch device 10 to perform the power-saving function or to power on combines user's intuitive response with determination of the designated gesture. Except for special functions, in most operation occasions of the touch device 10, user's line of sight will always fall in the range of the viewing angle of the AA on the touch device 10. Once the range of the viewing angle deviates from the user's line of sight, it implies that the user has no intention of continuously operating the touch device 10.

In the case of performing the power-saving function, the touch device 10 performs the power-saving function after confirming an intuitive response together with a designated gesture. Based on the foregoing description, with reference to FIG. 4, a method for controlling a touch device to perform a power-saving function in accordance with the present invention includes the following steps.

Figure 4:
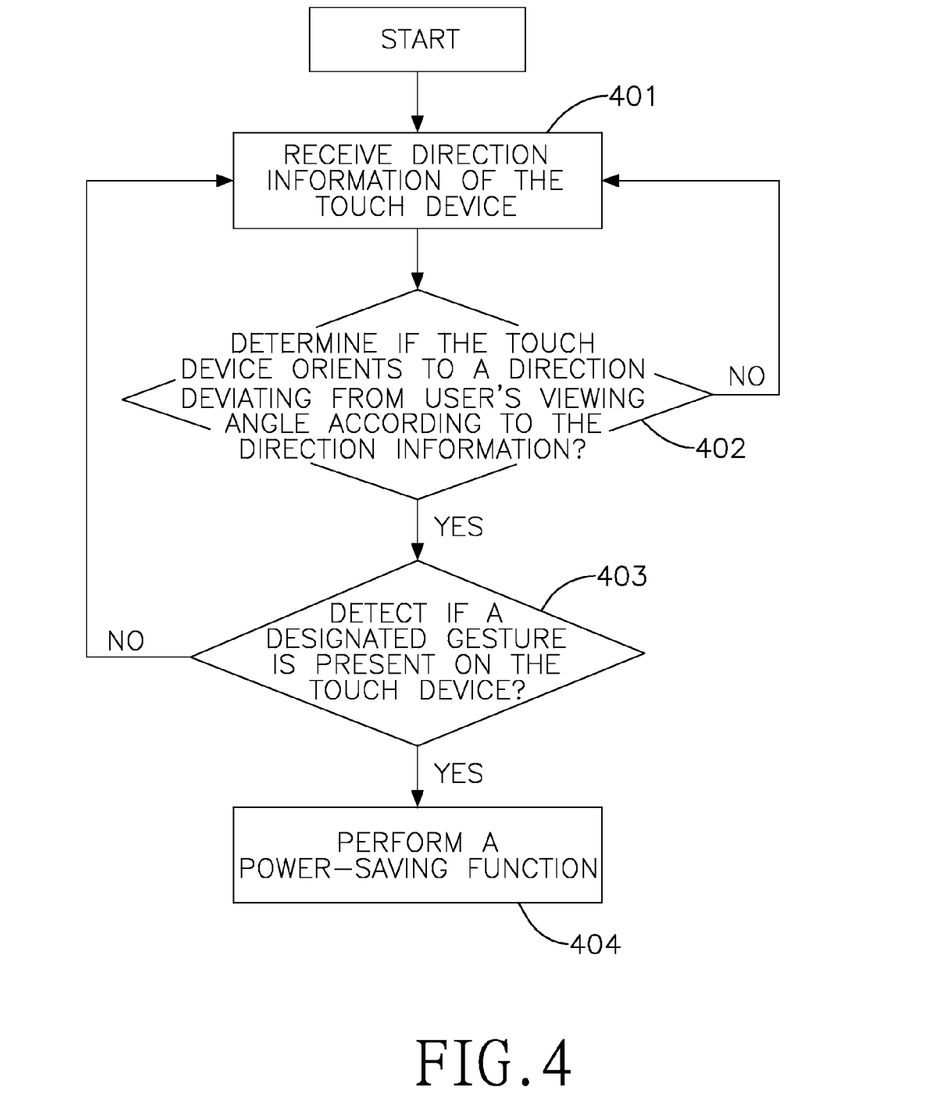
FIG. 4 is a flow diagram of a method for controlling a touch device to perform a power-saving function in accordance with the present invention.

Step 401: Receive direction information of the touch device.

Step 402: Determine if the touch device is oriented to a direction deviating from user's viewing angle according to the direction information. If the determination result is negative, resume step 401.

Step 403: Detect if a designated gesture is present on the touch device. If the detection result is negative, resume step 401.

Step 404: Perform a power-saving function.

It should be pointed out that there is no limitation to the sequence of detecting the designated gesture and detecting the event of deviating from user's viewing angle, and either one can be detected and determined first. In the present embodiment, deviation from user's viewing angle is detected before the designated gesture is detected. However, the present embodiment is given here for the purpose of exemplification and should not be treated as a limitation of implementing the foregoing method.

Figure 5:
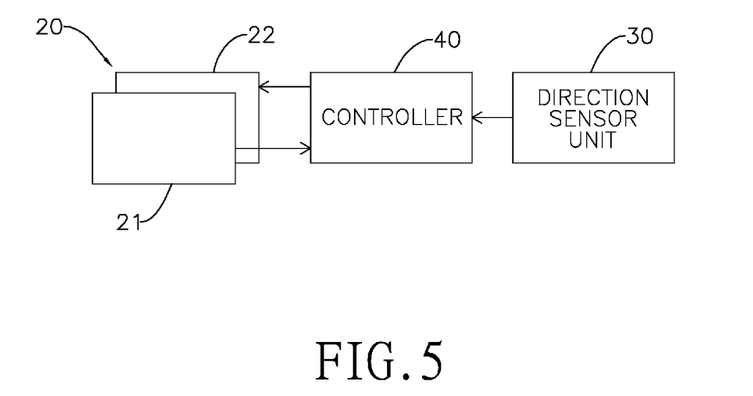
FIG. 5 is a functional block diagram of a first embodiment of a touch device in accordance with the present invention.

With reference to FIG. 5, a first embodiment of a touch device in accordance with the present invention has a touch control interface 20, a direction sensor unit 30 and a controller 40. The touch control interface 20 includes a touch sensitive area 21 and a displayed area 22, which are connected to the controller 40 as input and output interfaces of the touch device 10. The direction sensor unit 30 serves to detect a direction of the touch device 10, and is electrically connected to the controller 40 to provide direction information.

In the present embodiment, the direction sensor unit 30 includes an accelerometer sensor, which provides three-dimensional information in X, Y and Z axes of the touch device 10. The controller 40 determines if a range of viewing angle of the touch device 10 deviates from a user's line of sight according to the two-axis information (in X and Y axes) or the three-axis information (in X, Y and Z axes). In the present embodiment, the Z-axis information is used to determine if a momentum output in Z axis is greater than a threshold. When the momentum output in Z axis is greater than the threshold, it means that a momentum is present in a top-down direction of the touch device 10 and the touch device may be carried along. When the momentum output in Z axis is greater than another threshold, even though the X-axis and Y-axis information meets a determination condition, the direction of the touch device 10 is considered out of the viewing angle for the sake of false touch prevention.

The touch sensitive area 21 supports determination of multi-touch event and object, and may be a projected capacitive touch panel. When a user touches and slides on the touch sensitive area 21, the touch sensitive area 21 provides relevant coordinate information to the controller 40 for the controller 40 to determine if a designated gesture is present. Upon the foregoing gesture detection, the controller 40 can further include a false touch prevention algorithm to verify if a determined gesture is a correct gesture.

In the case of powering on the touch device 10, the touch device 10 starts a power-on function after detecting a designated gesture on the touch control interface and that the AA is oriented to a direction, which is within the viewing angle.

As to the designated gesture for powering on the touch device 10, besides being a known gesture to the touch device 10, the designated gesture should be designed to take easy determination and false touch prevention into account. A feasible gesture for powering on the touch device is given in the following as an example. However, the example does not limit the way of realizing the designated gesture for powering on the touch device 10.

Figure 6A:
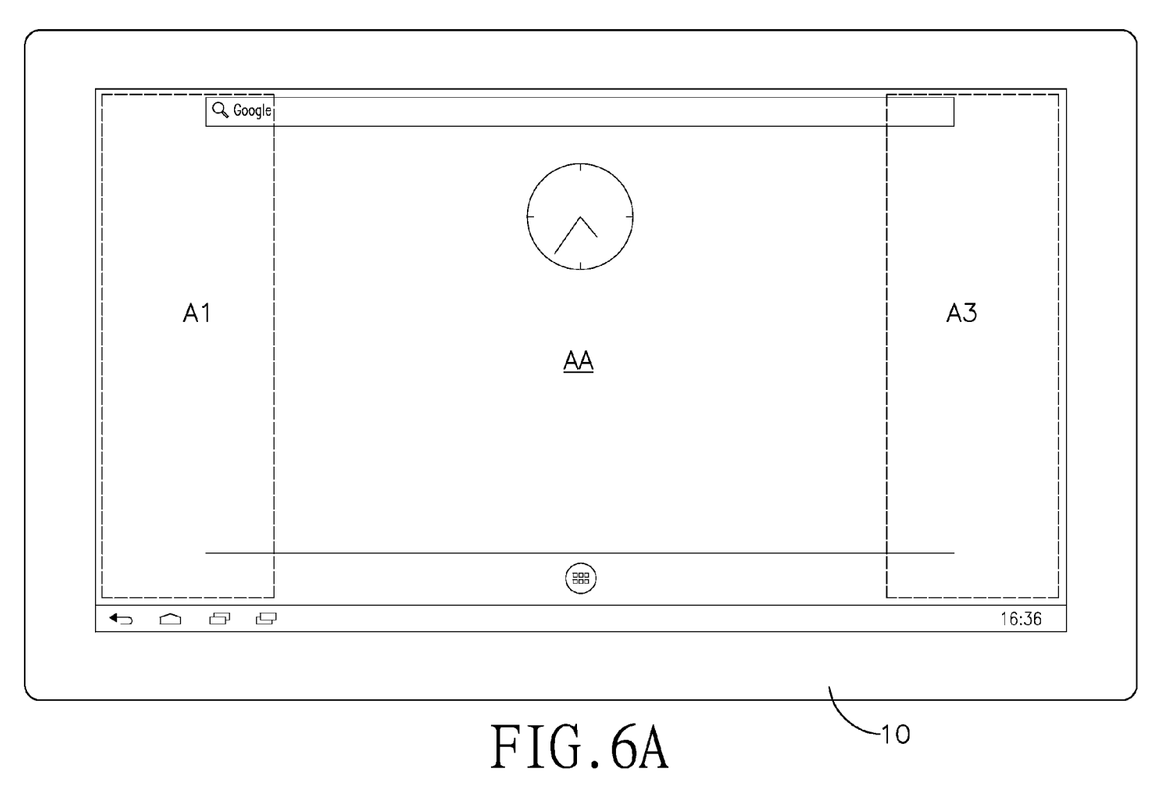
FIGS. 6A, 6B are front views showing gesture detection areas defined on the touch device in FIG. 1.
Figure 6B:
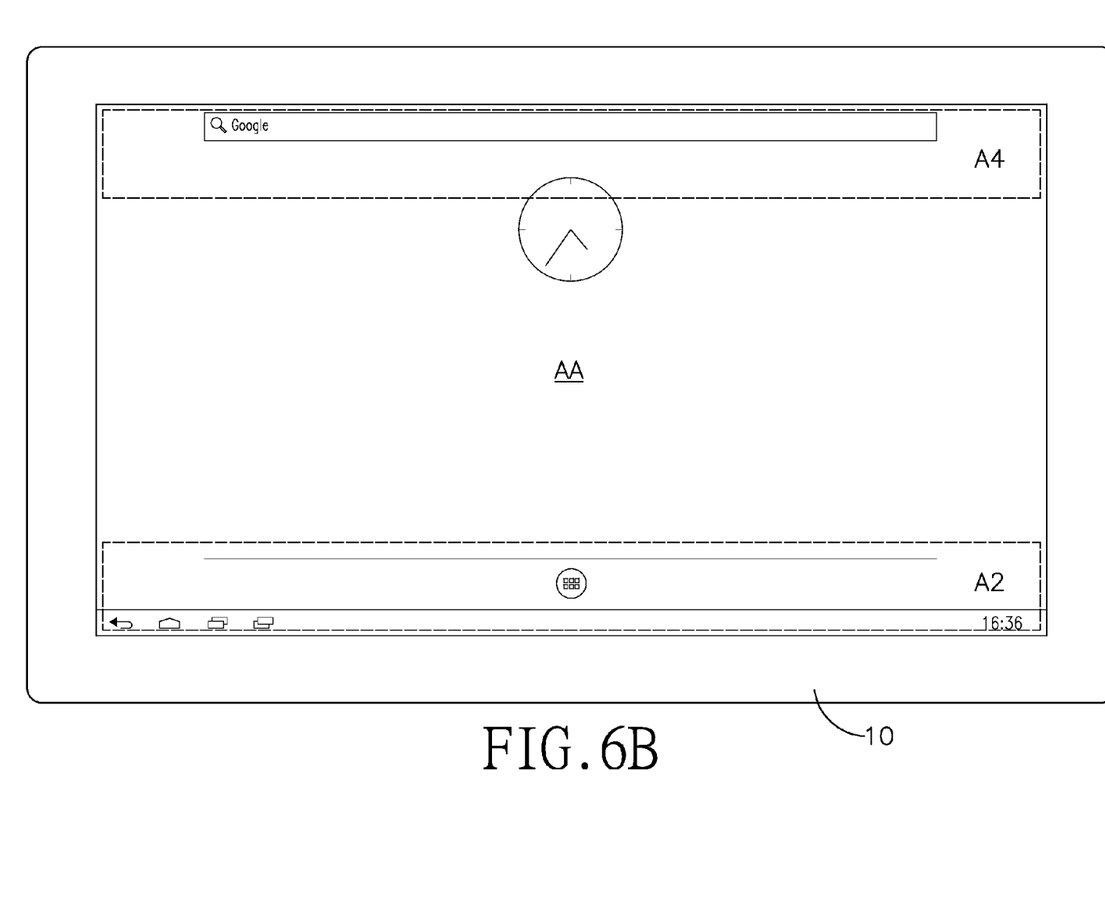

With reference to FIGS. 6A and 6B, the AA is available to display and touch operation. In the present embodiment, the designated gesture for powering on the touch device 10 involves a two-finger power-on gesture. Basically, the AA has four determination areas A1~A4 adjacent to a border of the AA. The two determination areas A1 and A3 are parallel to each other, and the two determination areas A2 and A4 are parallel to each other. Each of the two determination areas A2 and A4 is perpendicularly connected to ends of the determination areas A1 and A3 on a same side. When two fingers of a user respectively touch the determination areas A1 and A3 or A2 and A4, the two-finger power-on gesture is detected to take place.

Figure 7A:
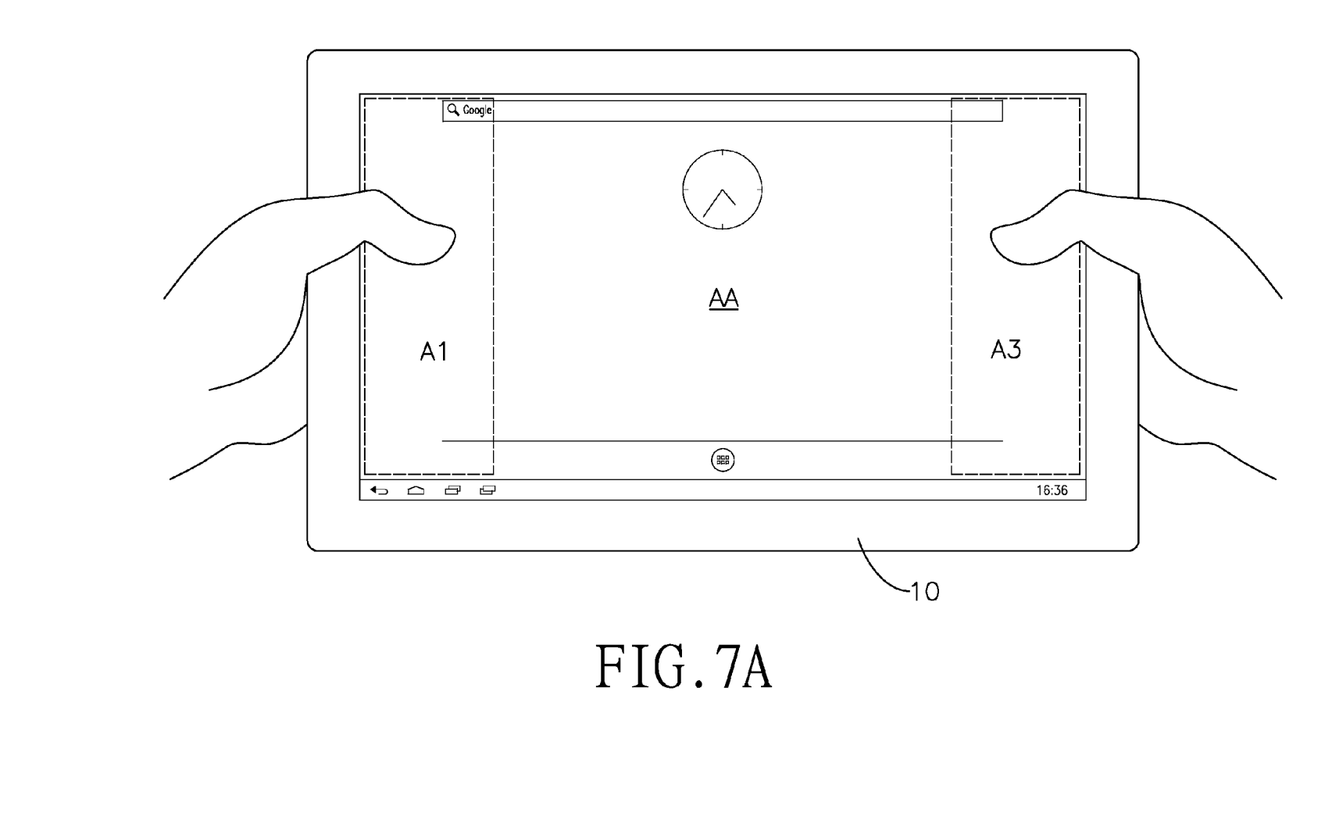
FIGS. 7A, 7B are operational front views showing power-on gestures on the touch device in FIG. 1.
Figure 7B:
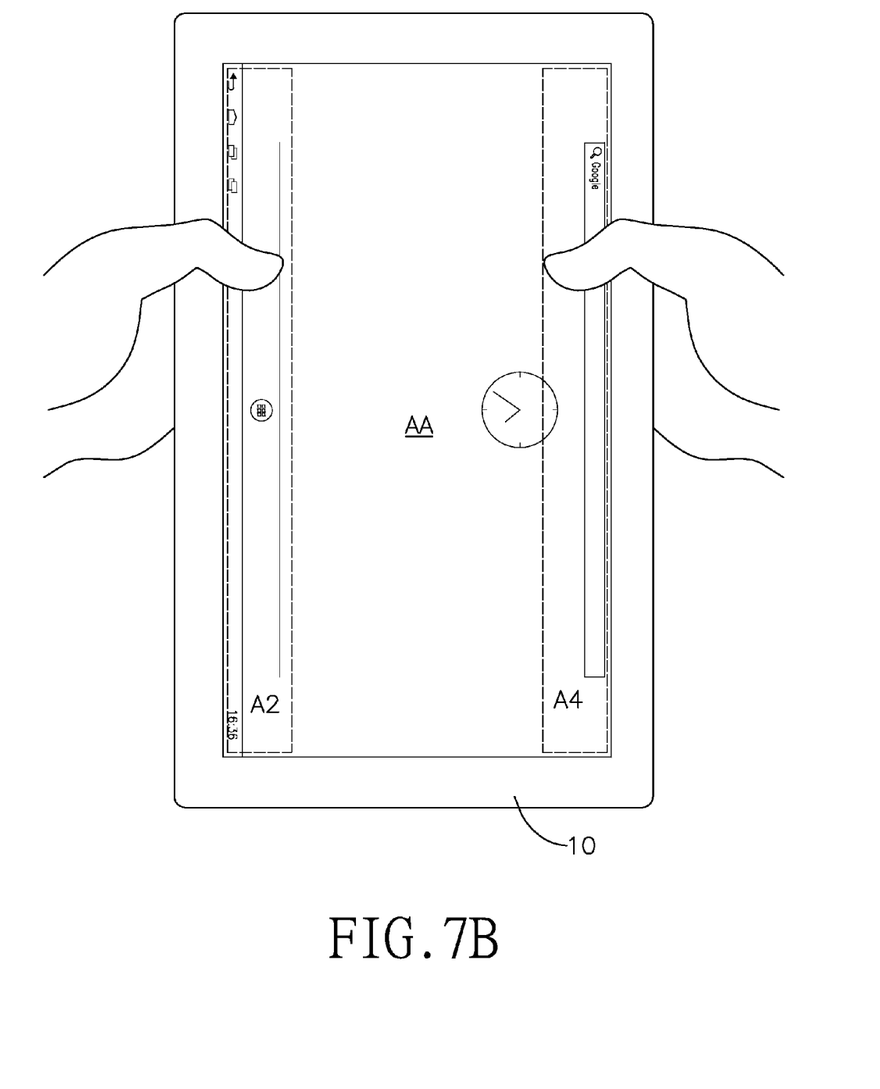

Despite a simple gesture, the two-finger power-on gesture also considers user's operation intention and false touch prevention. The condition for the touch device 10 to detect the two-finger power-on gesture must be met by detecting sensing values (generated by touches of fingers or objects) simultaneously appearing on the determination areas A1 and A3 or A 2 and A4. In other words, one-finger touch can never become a power-on gesture. In fact, two fingers respectively falling on two opposite edge portions of the AA is a gesture simulating user's both hands respectively holding a left edge portion and a right edge portion or a top edge portion and a bottom edge portion of the touch device 10 with the thumbs respectively touching the determination areas A1 and A3 or A2 and A4 in the vicinity as shown in FIGS. 7A and 7B. The two-finger power-on gesture considerably reflects a particular behavioral model and operation intention.

To ascertain user's operation intention more precisely, the present invention further determines if the AA of the touch device 10 falls within the viewing angle. When determining to be within the viewing angle and detecting that the power-on gesture takes place, the touch device 10 then powers on. When a user positions the touch device 10 for the AA to be within the viewing angle, it shows the intention of the user to operate the touch device 10. In collaboration with the confirmation of the particular power-on gesture, the power-on function can thus be performed.

Figure 8:
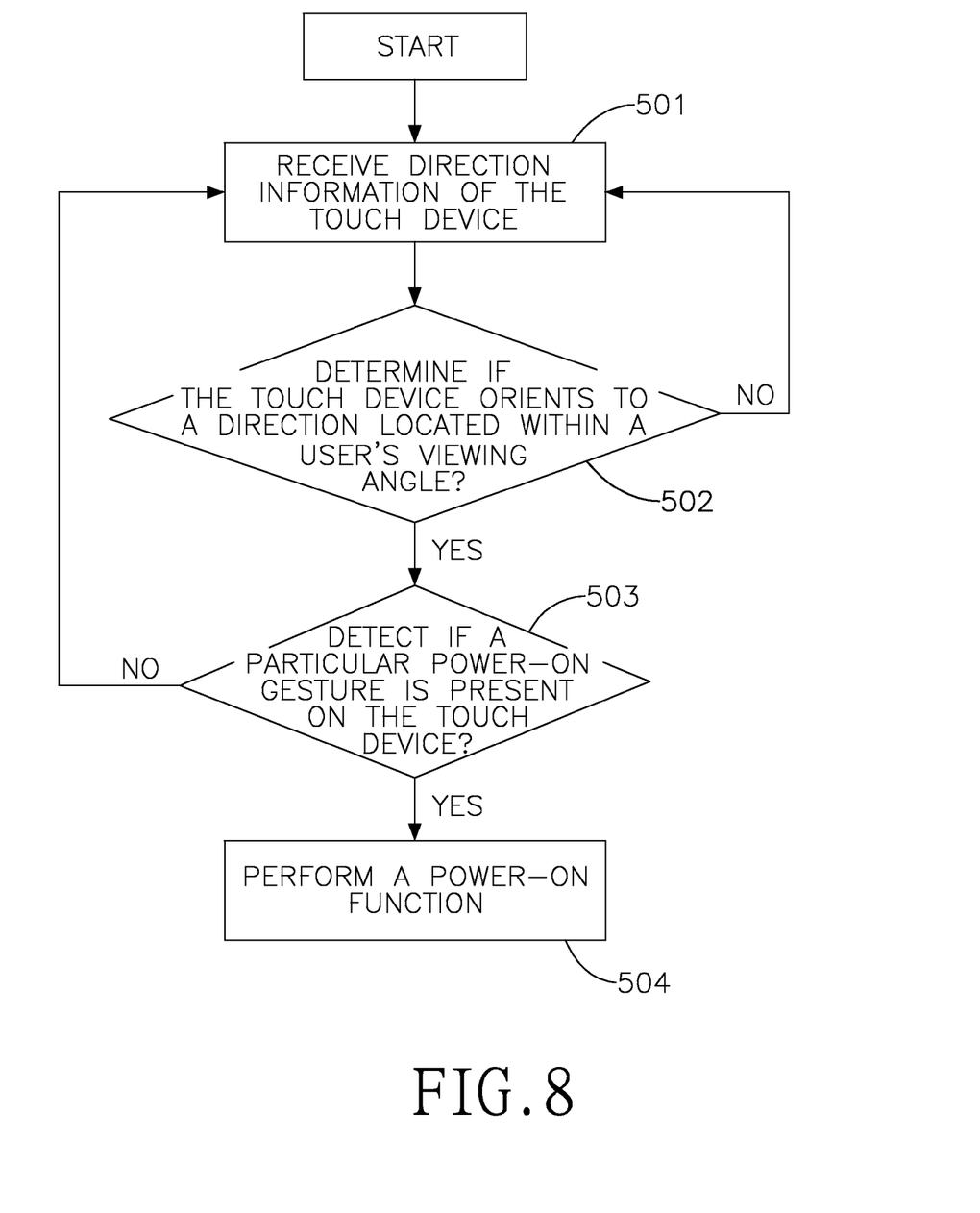
FIG. 8 is a flow diagram of a method for controlling a touch device to power on in accordance with the present invention.

Based on the foregoing description, with reference to FIG. 8, a method for controlling a touch device 10 to power on in accordance with the present invention includes the following steps.

Step 501: Receive direction information of the touch device.

Step 502: Determine if the touch device is oriented to a direction located within a user's viewing angle. If the determination result is negative, resume step 501.

Step 503: Detect if a particular power-on gesture is present on the touch device. If the detection result is negative, resume step 501.

Step 504: Perform a power-on function.

It should be pointed out that there is no limitation to the sequence of detecting the power-on gesture and detecting the user's viewing angle, and either one can be detected and determined first without influencing operation of the method for controlling a touch device to power on. In the present embodiment, user's viewing angle is determined before the designated gesture is detected. However, the present embodiment is given here for the purpose of exemplification and should not be treated as limitation of implementing the foregoing method.

Figure 9:
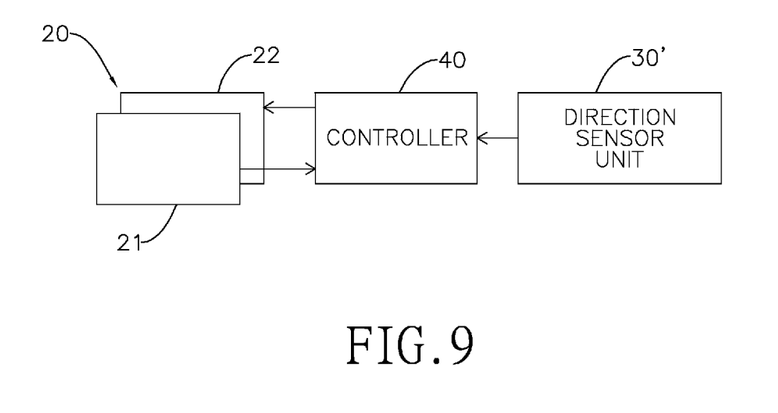
FIG. 9 is a functional block diagram of a second embodiment of a touch device in accordance with the present invention.

With reference to FIG. 9, a second embodiment of a touch device in accordance with the present invention has a touch control interface 20, a direction sensor unit 30', and a controller 40. The touch control interface 20 includes a touch sensitive area 21 and a displayed area 22, which are connected to the controller 40 as input and output interfaces of the touch device 10. The direction sensor unit 30' serves to detect a direction of the touch device 10, and is electrically connected to the controller 40 to provide direction information. In the present embodiment, the direction sensor unit 30' includes an accelerometer sensor, which provides three-dimensional information in X, Y and Z axes of the touch device 10. The controller 40 determines if the touch device 10 is oriented to a direction falling within the user's viewing angle according to the two-axis information (in X and Y axes) or the three-axis information (in X, Y and Z axes). In the present embodiment, the Z-axis information is used to determine if a momentum output in Z axis is greater than a threshold. When the momentum output in Z axis is greater than the threshold, it means that a momentum is present in a top-down direction of the touch device 10 and the touch device may be carried along. When the momentum output in Z axis is greater than another threshold, even though the X-axis and Y-axis information meets a determination condition, the direction of the touch device 10 is still considered out of the viewing angle for the sake of false touch prevention, and the touch device 10 does not power on.

The touch sensitive area 21 supports determination of multi-touch event and object, and may be a projected capacitive touch panel. When a user touches and slides on the touch sensitive area 21, the touch sensitive area 21 provides relevant coordinate information to the controller 40 for the controller 40 to determine if a power-on gesture takes place. Upon the foregoing gesture detection, the controller 40 can further include a false touch prevention algorithm to verify if a determined gesture is a correct gesture.

In sum, the touch device in accordance with the present invention detects a designated gesture for performing a power-saving function, such as activating a hibernation mode and powering off, or performing a power-on function, and determines that the direction of the touch device is within or out of a user's viewing angle so as to perform the power-saving function or the power-on function. All a user needs is to just intuitively orient the touch device to a direction within or out of the user's viewing angle and make a corresponding gesture such that the touch device can be easily powered on or enter a power-saving condition. Accordingly, the use of power button in touch devices can be significantly reduced in frequency, and convenient operation for performing those power-on and power-saving functions can be further provided.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for controlling a touch device to power off and power on, wherein the touch device has an accelerometer sensor, a touch control interface having a touch sensitive area and a controller connected to the accelerometer sensor and the touch control interface, the method performed by the controller and comprising steps of:
   receiving direction information of the touch device sensed by the accelerometer sensor;
   determining if the touch device is oriented to a direction that is out of or within a preset viewing angle according to the direction information;
   generating coordinate information when a designated power-off gesture or a power-on gesture is detected, at least one of the designated power-off gesture and the power-on gesture being a predetermined stroke pattern from a first touch point to a second touch point;
   determining if the designated power-off gesture or the power-on gesture is detected on the touch sensitive area of the touch control interface according to the coordinate information; and
   performing a power-saving function on the touch device when the coordinate information of the designated power-off gesture on the touch sensitive area and the direction information of the touch device which is oriented to the direction that is out of the preset viewing angle are detected; or performing a power-on function when the coordinate information of the designated power-on gesture on the touch sensitive area and the direction information of the touch device which is oriented to the direction that is within the present viewing angle are detected.

2. The method as claimed in claim 1, wherein when the direction of the touch device is determined to be out of the preset viewing angle, an angle included between the direction of the touch device and an X axis corresponding to a horizontal direction of the touch device is greater than the preset viewing angle.

3. The method as claimed in claim 1, wherein when the direction of the touch device is determined to be out of the preset viewing angle, an angle included between the direction of the touch device and a Y axis corresponding to a vertical direction of the touch device is greater than the preset viewing angle.

4. The method as claimed in claim 1, wherein the designated power-off gesture is selected from one of a multi-touch gesture, a swipe gesture, and a drawing gesture.

5. The method as claimed in claim 1, wherein the power-saving function enables the touch device to enter a hibernation mode.

6. The method as claimed in claim 1, wherein the power-saving function enables the touch device to power off.

7. The method as claimed in claim 1, wherein the designated power-on gesture is made by multiple fingers simultaneously touching the touch device.

8. The method as claimed in claim 1, wherein the designated power-on gesture is made by two fingers simultaneously touching two opposite edge portions of the touch device.

9. The method as claimed in claim 1, wherein the direction information of the touch device includes X-axis information and Y-axis information with coordinates respectively varying in an X axis corresponding to a horizontal direction of the touch device and in a Y axis corresponding to a vertical direction of the touch device.

10. The method as claimed in claim 1, wherein the preset viewing angle is determined according to a specification of a display portion of the touch device.

11. The method as claimed in claim 1, wherein the preset viewing angle is configured through a setting of the touch device.

12. The method as claimed in claim 1, wherein the power-on function serves to power on the touch device.

13. The method as claimed in claim 1, wherein the power-on function serves to wake up from a hibernation mode of the touch device.

14. The method as claimed in claim 1, wherein the touch device has a displayed area overlapping or within an area of the touch control interface, and the designated power-off gesture and the power-on gesture are detected on the touch control interface corresponding to at least a part of the displayed area.

15. A touch device, comprising:
a touch control interface having a touch sensitive area and a displayed area; wherein the touch sensitive area is configured to detect a designated power-off gesture or a designated power-on gesture and correspondingly generates coordinate information, at least one of the designated power-off gesture and the power-on gesture being a predetermined stroke pattern from a first touch point to a second touch point;
an accelerometer sensor serving to detect a direction of the touch device and provide direction information of the touch device; and
a controller connected to the touch sensitive area, the displayed area and the accelerometer sensor, the controller receiving the coordinate information and the direction information, when the coordinate information of the designated power-off gesture is detected on the touch sensitive area and the direction information of the touch device is oriented to the direction that is out of a preset viewing angle the controller performs a power-saving function and enable the touch device to enter a hibernation mode or to power off, or when the coordinate information of the designated power-on gesture is detected on the touch sensitive area and the direction information of the touch device is oriented to the direction that is within a preset viewing angle the controller performs a power-on function and enable the touch device to wake up from the hibernation mode or to power on.

16. The touch device as claimed in claim 15, wherein the power-saving function is performed when detecting the designated power-off gesture present on the touch device and determining that the direction of the touch device is out of the preset viewing angle.

17. The touch device as claimed in claim 16, wherein the direction of the touch device is determined to be out of the preset viewing angle, an angle included between the direction of the touch device and an X axis corresponding to a horizontal direction of the touch device is greater than the preset viewing angle.

18. The touch device as claimed in claim 16, wherein when the direction of the touch device is determined to be out of the preset viewing angle, an angle included between the direction of the touch device and a Y axis corresponding to a vertical direction of the touch device is greater than the preset viewing angle.

19. The touch device as claimed in claim 15, wherein the designated power-off gesture and the power-on gesture are detected on the touch sensitive area corresponding to at least a part of the displayed area.

* * * * *